US005874025A

United States Patent [19]

Heuer et al.

[11] Patent Number: 5,874,025

[45] Date of Patent: Feb. 23, 1999

[54] TIMBER PRESERVATIVE CONTAINING A COPPER COMPOUND

[75] Inventors: Lutz Heuer, Dormagen; Winfried Joentgen, Köln; Torsten Groth, Odenthal, all of Germany

[73] Assignee: Bayer Aktiengesellschaft, Leverkusen, Germany

[21] Appl. No.: 930,773

[22] PCT Filed: Apr. 1, 1996

[86] PCT No.: PCT/EP96/01434

§ 371 Date: Oct. 3, 1997

§ 102(e) Date: Oct. 3, 1997

[87] PCT Pub. No.: WO96/32235

PCT Pub. Date: Oct. 17, 1996

[30] Foreign Application Priority Data

Apr. 12, 1995 [DE] Germany ........................ 195 13 903.8

[51] Int. Cl.[6] ............................ A01N 3/00; A01N 37/44; C09D 5/14

[52] U.S. Cl. ....................... 252/383; 252/380; 106/15.05; 106/18.31; 106/18.32

[58] Field of Search ............................ 106/15.05, 18.31, 106/18.32; 252/380, 384, 383; 514/383; 424/630, 632, 633

[56] References Cited

U.S. PATENT DOCUMENTS

| | | | |
|---|---|---|---|
| 5,156,673 | 10/1992 | Metzner et al. | 106/15.05 |
| 5,248,450 | 9/1993 | Metzner et al. | 252/380 |
| 5,308,859 | 5/1994 | Metzner et al. | 514/383 |
| 5,399,190 | 3/1995 | Conradie et al. | 106/18 |
| 5,527,384 | 6/1996 | Williams et al. | 106/18.32 |
| 5,634,967 | 6/1997 | Williams et al. | 106/18.32 |
| 5,635,217 | 6/1997 | Goettsche et al. | 424/632 |
| 5,646,133 | 7/1997 | Sanders | 514/86 |
| 5,714,507 | 2/1998 | Valcke et al. | 514/383 |

FOREIGN PATENT DOCUMENTS

| | | |
|---|---|---|
| A-0593187 | 4/1994 | European Pat. Off. . |
| A-2158291 | 6/1973 | France . |
| WO-A-9302557 | 2/1993 | WIPO . |

OTHER PUBLICATIONS

Derwent Publications Ltd., London, AN 73–65325U GB; 1973.

Derwent Publications Ltd., London, GB; AN 68–16239Q; 1968.

Derwent Publications Ltd., London, GB; AN 95–019141; 1995.

*Primary Examiner*—Shean C. Wu

*Attorney, Agent, or Firm*—Sprung Kramer Schaefer & Briscoe

[57] ABSTRACT

Novel wood preservatives comprising at least one copper compound and polyaspartic acid or a derivative of the same, a triazole compound and if appropriate at least one synergistically complementing other fungicide and/or insecticide if appropriate an emulsifier and/or a small amount of alkanolamine.

8 Claims, No Drawings

TIMBER PRESERVATIVE CONTAINING A COPPER COMPOUND

BACKGROUND OF THE INVENTION

1. Field of the Invention

This application is 37/PCT/EP/96/01434, filed Apr. 1, 1996.

The application relates to alkanolamine-free/low-alkanolamine wood preservative comprising at least polyaspartic acid or derivatives thereof, a copper compound, a triazole compound which forms a synergistic complement to optionally one further fungicide and/or insecticide, and, if appropriate, an emulsifier and/or small amount of alkanolamine.

2. Description of Related Art

Wood preservatives based on inorganic copper compounds with alkanolamines as chelating agents have been disclosed (EP 89 958). Despite high copper contents in comparison with known copper- and chromate- containing salts with a comparable copper content, the efficacy of these compositions against wood-destroying Basidiomycetes is insufficient.

Wood preservatives based on copper compounds and alkanolamines which comprise a triazole compound and an emulsifier or which comprise a phosphonium compound and which are effective against wood-destroying Basidiomycetes have also been disclosed (DE 4 112 652/WO 93/02557/WO 91/11306).

Synergistic mixtures for the protection of wood based on, for example, propiconazole and tebuconazole (EP 393,746, EP 385,076, EP 413,909, EP 548,759, WO 93/02557), if appropriate with the use of an insecticide as a component in the mixture, have also been disclosed.

SUMMARY OF THE INVENTION

It was now aim and object of the present invention to find a wood preservative which is, firstly, highly effective against wood-discoloring and wood-destroying fungi and against wood-destroying insects, in particular against wood-destroying longhorn beetles (Cerambycidae, Lyctidae, Bostrychidae and Anobiidae) including termites and which has a good long-term action, the activity of the fungicide not being adversely affected by the insecticide and vice versa. In addition, the wood preservative should penetrate wood and woodbased materials well. A further aim is to reduce the loss of alkanol amines, caused by evaporation or leaching, for ecological and work-hygiene reasons. This is best achieved by markedly reducing the amount of alkanol amine (if appropriate down to zero) and by another substance fully or partly replacing the former in its function.

A further aim was to prevent degradation of the organic active compound which occurs in wood and woodbased materials on contact with the soil. Since this degradation of the active substance is not necessarily caused by wood-destroying and/or wood discoloring fungi, but also by other microorganisms with which they occur together, it is necessary to use a further biocidal component in addition to the synergistically acting mixture of, for example, tebuconazole and, if appropriate, a further fungicide and/or insecticide, in order to achieve a long-term action of the organic active compounds. This is why copper compounds, if appropriate together with boron derivatives or nitrite-containing salts are admixed according to the invention.

The invention therefore relates to a wood preservative which comprises, in addition to a copper compound and polyaspartic acid or a derivative of the same, a triazole compound and optionally at least one synergistically complementing, further fungicide and/or insecticide and, if appropriate, an emulsifier and/or a small amount of alkanolamine.

DETAILED DESCRIPTION OF THE PREFERRED EMBODIMENTS

Despite the greatly reduced alcohol amine content, the copper compound is dissolved as a clear solution. Nor are any insoluble copper/polyaspartic acid addition products observed, as is known in some cases for the biuret reaction $Cu^{2+}$+ protein.

Despite the fact that the wood preservative comprises copper compounds, the two fungicides are distributed, emulsified or dissolved in the form of a clear fluid upon dilution with water. The advantage of the compositions according to the invention is the fact that, for example, triazole compounds, which are not soluble in water, exist in the novel compositions in the form of aqueous emulsions or clear aqueous concentrates. Clear aqueous fluids are formed upon dilution with water.

By adding small amounts of organic solvents to the wood preservative, for example alcohols (ethanol, isopropanol), glycols (ethylene glycol, propylene glycol), glycol ethers (ethylene glycol monomethyl ether, ethylene glycol monoethyl ether), glycol ether esters (butyl glycol acetate), dimethylformamide, N-methylpyrrolidone, it is possible to obtain homogeneous concentrates. The solvents additionally act as solubilizers for the fungicides. When additionally using arylcarboxylic acids, cycloalkylcarboxylic acids or aliphatic $C_5$–$C_{20}$-mono- or dicarboxylic acids or corresponding amine, alkali metal or copper salts, it is, however, possible to reduce the solvents to a minimum in order to obtain homogeneous concentrates. In any case, the mixture or the concentrate comprises water as constituent.

The copper compounds can be employed in the form of water- soluble or water-insoluble compounds, for example copper sulphate, copper acetate, copper hydroxide, copper oxide, copper borate, copper fluoride, copper hydroxide carbonate, basic copper carbonate, copper nitrate, copper chloride and copper phosphate.

A further component of the formulation according to the invention is polyaspartic acid, its derivatives or its copolymers together with other compounds. For the purposes of the present invention, polyaspartic acid, polyaspartic acid derivative and polyaspartic acid copolymer are also to be understood as meaning the corresponding salts of the compounds.

The preparation and the use of polyaspartic acid (PAA) and its derivatives have long been the object of a large number of publications and patents.

In accordance with J. Org. Chem., 24, p. 1662–1666 (1959), polysuccinimide, termed "anhydropolyaspartic acid" in that publication, is obtained by thermal polycondensation of maleamidic acid, monoammonium malate at temperatures up to 200° C. The polymer yields were 75 to 79% at 200° C. Other possible starting materials which are mentioned are malic acid, maleic anhydride, fumaric acid and asparagine.

Equally, the preparation can be carried out by subjecting aspartic acid to thermal polycondensation as described in J. Org. Chem. 26, 1084 (1961). First, the polysuccinimide (PSI), equally termed "anhydropolyaspartic acid" in that publication, is obtained as an intermediate. PSI can be converted into PAA by hydrolysis.

U.S. Pat. No. 4,839,461 (=EP-A 0 256 366) describes the preparation of polyaspartic acid from maleic anhydride, water and ammonia. Maleic anhydride is converted into the monoammonium salt in an aqueous medium with addition of concentrated ammonia solution, and the water is subsequently evaporated from the solution. The mono- ammonium salt is polymerized in substance. During this polymerization process, the mass first becomes highly viscous and subsequently solid-porous, requiring handling which is complicated due to its complex procedure.

U.S. Pat. No. 4,590,260 discloses that amino acids together with derivatives of malic, maleic and/or fumaric acid can be subjected to polycondensation at 100° to 225° C. In accordance with U.S. Pat. No. 4,696,981, microwaves may successfully be employed for carrying out such a reaction.

DE-A 2 253 190 describes a process for the preparation of polyamino acid derivatives, specifically polyaspartic acid derivatives. According to this publication, not only aspartic acid, but also maleic acid derivatives (monoammonium salt and monoamide), are thermally polymerized to give the intermediate PSI, which can subsequently be reacted with amines in suitable solvents to give the desired polyamino acid derivatives.

U.S. Pat. No. 5,296,578 describes the preparation of PSI from maleic anhydride, water and ammonia. Maleic anhydride is hydrolysed in water to give maleic acid and the product is subsequently converted into the ammonium salt using concentrated ammonia solution. The water is evaporated from the solution in a stirred reactor, and the monoammonium salt is subsequently polymerized in bulk at temperatures above 170° C. to give PSI. To this end, the mass is reacted in the course of several hours via highly viscous phase stages to give the solid PSI, which is subsequently hydrolysed to give PAA.

U.S. Pat. No. 5,288,783 describes the preparation of PAA from maleic acid or fumaric acid, water and ammonia. Maleic anhydride is mixed with water in a stirred reactor, and reacted, with cooling, to give maleic acid. The monoammonium maleate is prepared by adding concentrated ammonia solution. The water contained is subsequently evaporated, and the dry monoammonium salt is polymerized at temperatures from 190° to 350° C. As an alternative, it is proposed to process the monoammonium salt, which is in aqueous solution, by means of extrusion at temperatures from 160° to 200° C. to give PSI. The PSI, which has been prepared by one of the two process routes, is subsequently subjected to alkaline hydrolysis to give PAA.

EP-A 593 187 describes the preparation of PSI by subjecting maleamidic acid to thermal polymerization at temperatures from 160° to 330° C. at a reaction time of 2 minutes to 6 hours. Mention is also made of polycondensation in a solvent using condensing auxiliaries.

DE-A 4 221 875 describes the preparation of modified polyaspartic acids by polycondensation and their use as additives for detergents, cleaners, water-treatment agents and anti-incrustation agents when evaporating sugars.

The polymers used according to the invention have repeating succinyl units of one of the following structures:

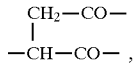
, preferably

-continued

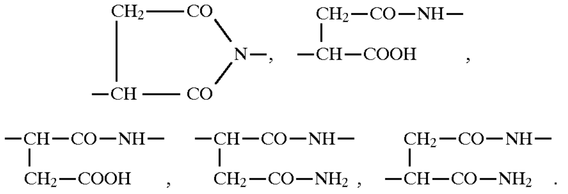

In addition, further repeating units may be present due to suitable reaction control and selection of the starting materials, for example a) Malic acid units of the formula

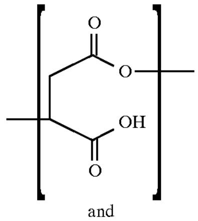

and

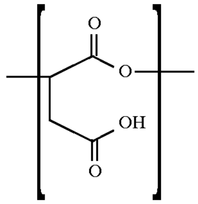

b) Maleic acid and fumaric acid units of the formula

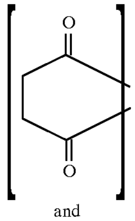

and

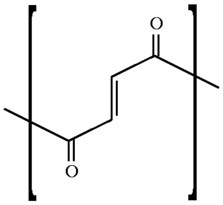

c) Iminodisuccinate units of the formula

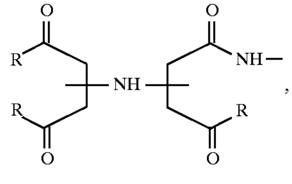
,

-continued

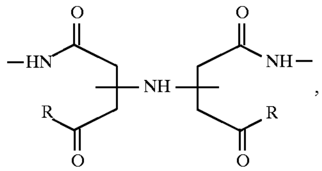

,

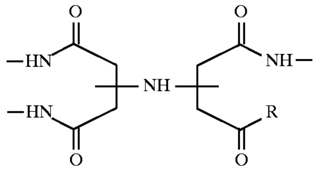

and

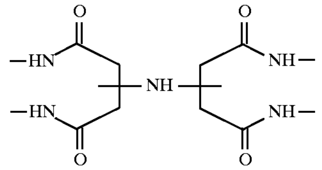

R = OH, $O^-NH_4^+$, $NH_2$

The chemical structure is preferably analysed using $^{13}C$—NMR, FT—IR and, after total hydrolysis, using HPLC, GC and GC/MS.

If appropriate, the polymerization products can be converted into a PAA-containing salt in the presence of water in order to be reacted with a base. The base conversion of PSI-containing into PAA-containing polymers is subsequently carried out in a suitable device by means of hydrolysis. A pH of between 5 and 14 is preferably suitable. In a particularly preferred form, a pH of 7 to 12 is chosen, in particular by adding a base. Suitable bases are alkali metal and alkaline-earth metal hydroxides or carbonates such as, for example, sodium hydroxide solution, potassium hydroxide solution, sodium carbonate or potassium carbonate, ammonia and amines such as triethylamine, triethanolamine, diethylamine, diethanolamine, alkylamines and the like.

The hydrolysis temperature is suitably in a range up to and including the boiling point of the PSI suspension and preferably at 20° to 150° C. If appropriate, hydrolysis is carried out under pressure.

However, it is also possible to obtain the free polyaspartic acid by purely aqueous hydrolysis or by treating the salt with acids or acidic ion exchangers. In the present invention, the term "polyaspartic acid" (=PAA) also embraces the salts, unless expressly stated otherwise. The finished product is obtained by drying, preferably spray drying.

Depending on the reaction conditions, for example residence time and temperature of the thermal polymerization, the polymer prepared has various chain lengths or molecular weights, according to gel permeation chromatography analyses (MW=500 to 10,000, preferably 700 to 5,000, especially preferably 1,000 to 4,500). In general, the beta form accounts for over 50%, preferably over 70%.

The invention furthermore relates to the use of modified polyaspartic acids obtained by reacting a) 0.1–99.9 mol % of the abovementioned starting materials or 0.1–99.9 mol % of aspartic acid with b) 99.9–0.1 mol % of fatty acids, fatty acid amides, polybasic carboxylic acids and their anhydrides and amides, polybasic hydroxycarboxylic acids and their anhydrides and amides, polyhydroxycarboxylic acids, aminocarboxylic acids, sugar carboxylic acids, alcohols, polyols, amines, polyamines, alkoxylated alcohols and amines, amino alcohols, amino sugars, carbohydrates, ethylenically unsaturated mono- and polycarboxylic acids and their anhydrides and amines, protein hydrolysates, for example maize protein hydrolysate, soya bean protein hydrolysate, aminosulphonic acids and aminophosphonic acids, reacted by the above-described process according to the invention.

The starting materials described under a) are employed in the polymerization reaction according to the invention in amounts of 0.1 to 99.9 mol %, preferably 60 to 99.9 mol % and especially preferably 75 to 99.9 mol %.

Suitable as component (b) of the polymers are all fatty acids. They can be saturated or ethylenically unsaturated. Examples are formic acid, acetic acid, propionic acid, butyric acid, lauric acid, palmitic acid, stearic acid, oleic acid, linoleic acid, linolenic acid, sorbic acid, myristic acid, undecanoic acid and all naturally occurring fatty acid mixtures, for example $C_{12}/C_{14}$- or $C_{16}/C_{18}$ - fatty acid mixtures. Other unsaturated fatty acids which can be employed are acrylic acid and methacrylic acid.

These acids may furthermore also be used in the form of their amides. Examples of polybasic carboxylic acids which can be employed are oxalic acid, succinic acid, glutaric acid, adipic acid, malonic acid, suberic acid, aconitic acid, itaconic acid, sulphosuccinic acid, alkenylsuccinic acids ($C_1$–$C_{26}$), 1,2,3-propanetricarboxylic acid, butanetetracarboxylic acid, furandicarboxylic acid, pyridine dicarboxylic acid. The anhydrides of polybasic carboxylic acids, for example succinic anhydride, itaconic anhydride, aconitic anhydride and phtalic anhydride may also be used. Polybasic hydroxycarboxylic acids and polyhydroxycarboxylic acids are also suitable as component (b). In addition to at least one hydroxyl group, polybasic hydroxycarboxylic acids have attached to them at least two or more carboxyl groups. Examples which are mentioned in this context are malic acid, tartaric acid, uvic acid, citric acid and isocitric acid.

In addition to a carboxylic acid group, monobasic polyhydroxycarboxylic acids have attached to them two or more hydroxyl groups, for example glyceric acid, dimethylolpropionic acid, dimethylolbutyric acid, gluconic acid. Other substances which are suitable are monohydric alcohols having, for example, 1 to 22 C atoms such as, for example, methanol, ethanol, n-propanol, i-propanol, butanol, pentanol, hexanol, octanol, lauryl alcohol, stearyl alcohol and the like. If appropriate, the alcohols may also have a double bond, such as allyl alcohol or oleyl alcohol. Moreover, these alcohols may be alkoxylated, for example with ethylene oxide or propylene oxide. Substances which are particularly of technical interest are the adducts of 3 to 50 mol of ethylene oxide and fatty alcohols or oxo alcohols. Other substances which can be employed as component (b) are polyols, either saturated or unsaturated, such as, for example, ethylene glycol, propylene glycol, butanediol, butenediol, glycerol, trimethylolpropane, pentaerythritol, sorbitol, neopentyl glycol, and alkoxylated polyols such as polyethylene glycols, polypropylene glycols, ethoxylated trimethylolpropane, glycerol or pentaerythritol having molecular weights of up to 6,000. Also suitable as comonomer (b) are, in addition, amines such as $C_1$–$C_{22}$-alkylamines, for example methylamine, ethylamine, propylamine, butylamine, cyclohexylamine, octylamine, isooctylamine (ethylhexylamine), stearylamine, allylamine, oleylamine, ethylenediamine, diethylenetriamine, hexamethylenediamine, piperazine, diaminobutane, dimethylamine, diethylamine, hydroxylamine, hydrazine, ethanolamine, diethanolamine, aminopropanediol, and polyalkyleneamines such as polyethyleneamine, with molecular weights of up to 6,000. The amines may also be alkoxylated, for example the adducts of 3 to 30 mol of ethylene oxide and fatty amines such as oleylamine, palmitylamine, stearylamine. Amino sugars such as aminosorbitol or chitosamine are furthermore also suitable. Furthermore as component (b) carbohydrates such as glucose, sucrose, maltose, dextrins, starch or sugar carboxylic acids, for example mucic acid, gluconic acid, glucuronic acid, glucaric acid. Moreover, amino acids, proteinogens such as glycine, alanine, glutamic acid and lysine or non-proteinogens such as 4-aminobutyric acid, diaminosuccinic acid, 11-aminoundecanoic acid and 6-aminocaproic acid may be employed as component (b). The compounds of component (b) are employed in the polymerization in amounts of 0.1 to 99.9 mol %, preferably 0.1 to 40 mol %, especially preferably 0.1 to 25 mol %. A single compound of component (b) or mixtures of two or more compounds of (b) may be employed.

If monofunctional compounds such as alcohols, amines, fatty acids or fatty acid amides are used as component (b), they are incorporated at the end of the chain. They act as chain terminators and lower the molecular weight. Polyfunctional compounds of the component (b) can be incorporated in the finished polymer both at the end of the chain and randomly distributed over the polymer chain.

The crude polymers can be freed from monomer constituents by customary working-up methods, for example by extraction with water and 1—N hydrochloric acid, or by membrane filtration. The copolymers are analysed by $^{13}C$— and $^{15}N$—NMR spectroscopy, FT—IR spectroscopy and, after total hydrolysis, by HPLC, GC and GC—MS. In the polymerization process according to the invention, the polymer is primarily obtained in the form of the modified polysuccinimides, which are mostly insoluble in water.

The modified polyaspartic acids are prepared from the polysuccinimides, preferably by aqueous hydrolysis at 20° C. to 150° C. and pH 7 to 12, if appropriate under pressure. However, this reaction can also be carried out at temperatures outside the temperature range indicated and at other pH values. Suitable bases are alkali and alkaline-earth metal hydroxides or carbonates such as, for example, sodium hydroxide, potassium hydroxide, sodium carbonate or potassium carbonate, ammonia and amines such as triethylamine, triethanolamine, diethylamine, diethanolamine, alkylamines and the like. This gives partially or fully neutralized copolymers which comprise 0.1 to 99.9 mol % of aspartic acid and 99.9 to 0.1 mol % of at least one compound (b) forming part of the polymer.

An alkanolamine is, in particular, monoethanolamine; the use of other alkanolamines, for example isopropanolamine 1,1-, 1,2-diaminoethanol, aminoethylethanolamine, diethanolamine, triethanolamine, methylethanolamine, N-methylaminoethanol, N-ethylaminoethanol, ethanolhydrazine, N-butylaminoethanol, N-phenylaminoethanol and (2-aminoethoxy)ethanol is possible.

The amount of the polyaspartic acid/derivatives thereof which are added and, if appropriate, a small amount of alkanolamines is advantageously chosen in such a way that a pH of 4 or above, preferably 8.5 to 10.5, results in the dilute aqueous impregnating solution. The amount of the polyaspartic acid/ derivatives thereof and of the amines should be sufficiently high for complexing the copper.

Synergistic mixtures of triazole compounds such as, for example, tebuconazole are preferably obtained with one or more fungicides from the series consisting of:

azaconazole, bromuconazole, cyproconazole, dichlobutrazol, diniconazole, hexaconazole, metconazole, penconazole, epoxyconazole, methyl (E)-methoximino [α-(o-tolyloxy)-o-tolyl)]acetate, methyl (E)-2-{2-[6-(2-cyanophenoxy)-pyrimidin-4-yl-oxy]phenyl}-3-methoxyacrylate, methfuroxam, carboxin, fenpiclonil, 4(2,2-difluoro-1,3-benzodioxol-4-yl)-1H-pyrrole-3-carbonitrile, butenafine, 3-iodo-2-propinyl n-butylcarbamate (IPBC) and/or polymeric quaternary ammonium borates (disclosed in EP 355 316 and EP 556 454).

Preferred synergistic fungicidal or insecticidal components in the mixture are also the fungicides or insecticides which follow.

Triazoles

Amitrole, azocylotin, bitertanol, fenbuconazole, fenchlorazole, fenethanil, fluquinconazole, flusilazole, flutriafol, imibenconazole, isozofos, myclobutanil, metconazole, epoxyconazole, paclobutrazol, (±))-cis-1-(4-chlorophenyl)-2-(1H-1,2,4-triazol-1-yl)-cycloheptanol, tetraconazole, triadimefon, triadimenol, triapenthenol, triflumizole, triticonazole, uniconazole and their metal salts and acid adducts.

Imidazoles

Imazalil, pefurazoate, prochloraz, triflumizole, 2-(1-tert-butyl)-1-(2-chlorophenyl)-3-(1,2,4-triazol-1-yl)-propan-2-ol, thiazolecarboxanilides such as 2', 6'-dibromo-2-methyl-4-trifluoromethoxy-4'-trifluoromethyl-1,3-thiazole-5-carboxanilide, and their metal salts and acid adducts.

Methyl(E)-2-[2-[6-(2-cyanophenoxy)pyrimidin-4-yloxy]phenyl]3-methoxyacrylate, methyl(E)-2-[2-[6-(2-thioamidophenoxy)pyrimidin-4-yloxy]phenyl]-3-methoxyacrylate, methyl(E)-2-[2-[6-(2-fluorophenoxy)pyrimidin-4-yloxy]phenyl]-3-methoxyacrylate, methyl (E)-2-[2-[6-(2,6-difluorophenoxy)pyrimidin-4-yloxy]phenyl]-3-methoxyacrylate, methyl(E)-2-[2-[3-(pyrimidin-2-yloxy)phenoxy]phenyl]-3-methoxyacrylate, methyl(E)-2-[2-[3-(5-methylpyrimidin-2-yloxy)-phenoxy]phenyl]-3-methoxy-acrylate, methyl(E)-2-[2-[3-(phenylsulphonyloxy)phenoxy]phenyl-3-methoxyacrylate, methyl(E)-2-[2-[3-(4-nitrophenoxy)phenoxy]phenyl]-3-methoxyacrylate, methyl(E)-2-[2-phenoxyphenyl]-3-methoxyacrylate, methyl(E)-2-[2-(3,5-dimethylbenzoyl)pyrrol-1-yl]-3-methoxyacrylate, methyl(E)-2-[2-(3-methoxyphenoxy)phenyl]-3-methoxyacrylate, methyl(E)-2[2-(2-phenylethen-1-yl)-phenyl]-3-methoxyacrylate, methyl(E)-2-[2-(3,5-dichlorophenoxy)pyridin-3-yl]-3-methoxyacrylate, methyl(E)-2-(2-(3-(1,1,2,2-tetrafluoroethoxy)phenoxy)phenyl)-3-methoxyacrylate, methyl(E)-2-(2-[3-(alphahydroxybenzyl)phenoxy]phenyl)-3-methoxyacrylate, methyl(E)-2-(2-(4-phenoxypyridin-2-yloxy)phenyl)-3-methoxyacrylate, methyl(E)-2-[2-(3-n-propyloxyphenoxy)phenyl]3-methoxyacrylate, methyl(E)-2-[2-(3-isopropyloxyphenoxy)phenyl]-3-methoxyacrylate, methyl(E)-2-[2-[3-(2-fluorophenoxy)phenoxy]phenyl]-3-methoxyacrylate, methyl(E)-2-[2-(3-ethoxyphenoxy)phenyl]-3-methoxyacrylate, methyl(E)-2-[2-(4-tert-butylpyridin-2-yloxy)phenyl]-3-methoxyacrylate, methyl(E)-2-[2-[3-(3-cyanophenoxy)phenoxy]phenyl]-3-methoxyacrylate, methyl(E)-2-[2-[(3-methylpyridin-2-yloxymethyl)phenyl]-3-methoxyacrylate, methyl(E)-2-[2-[6-(2-methylphenoxy)pyrimidin-4-yloxy]phenyl]-3-methoxyacrylate, methyl (E)-2-[2-(5-bromopyridin-2-yloxymethyl)phenyl]-3-methoxyacrylate, methyl(E)-2-[2-(3-(3-iodopyridin-2-yloxy)phenoxy)phenyl]-3-methoxyacrylate, methyl(E)-2-[2-[6-(2-chloropyridin-3-yloxy)pyrimidin-4-yloxy]

phenyl]-3-methoxyacrylate, (E), (E)methyl-2-[2-(5,6-dimethylpyrazin-2-ylmethoximinomethyl)phenyl]-3-methoxyacrylate, (E)-methyl-2-{2-[6-(6-methylpyridin-2-yloxy)pyrimidin-4-yloxy]phenyl}-3-methoxyacrylate, (E),(E)methyl-2-{2-(3-methoxyphenyl) methyloximinomethyl]phenyl}-3-methoxyacrylate, (E)methyl-2-{2-(6-(2-azidophenoxy)-pyrimidin-4-yloxy] phenyl }-3-methoxyacrylate, (E),(E)methyl-2-{2-[6-phenylpyrimidin-4-yl)-methyloximinomethyl]phenyl}-3-methoxyacrylate,(E),(E)methyl-2-{2-[(4-chlorophenyl)-methyloximinomethyl]phenyl}-3-methoxyacrylate,(E) methyl-2-{2-[6-(2-n-propylphenoxy)-1,3,5-triazin-4-yloxy]phenyl}-3-methoxyacrylate, (E),(E)methyl-2-{2-[(3-nitrophenyl)methyloximinomethyl]phenyl}-3-methoxyacrylate;

Succinate dehydrogenase inhibitors such as:

Fenfuram, furcarbanil, cyclafluramid, furmecyclox, seedvax, metsulfovax, pyrocarbolid, oxycarboxin, shirlan, mebenil (mepronil), benodanil, flutolanil (Moncut);

Naphthalene derivatives such as:

Terbinafine, naftifine, butenafine, 3-chloro-7-(2-aza-2,7, 7-trimethyl-oct-3-en-5-ine);

Sulfenamides, such as dichlofluanid, tolylfluanid, folpet, fluorfolpet; captan, captofol;

Benzimidazoles, such as carbendazim, benomyl, furathiocarb, fuberidazole, thiophonatmethyl, thiabendazole or their salts;

Morpholine derivatives, such as tridemorph, fenpropimorph, falimorph, dimethomorph, dodemorph; aldimorph, fenpropidine and their arylsulphonates, such as, for example, p-toluenesulphonic acid and p-dodecylphenylsulphonic acid;

Dithiocarbamates, cufraneb, ferbam, mancopper, mancozeb, maneb, metam, metiram, thiram, zeneb, ziram:

Benzothiazoles, such as 2-mercaptobenzothiazole; Benzam ides, such as 2,6-dichloro-N-(4-trifluoromethylbenzyl)-benzamide; Boron compounds, such as boric acid, boric esters, borax;

Formaldehyde and formaldehyde-releasing compounds, such as benzyl alcohol mono(poly)-hemiformal, oxazolidine, hexa-hydro-S-triazines, N-methylol-chloroacetamide, paraformadehyde, nitropyrin, oxolinic acid, tecloftalam;

Tris-N-(cyclohexyldiazeneiumdioxy)-aluminium, N-(cyclohexyldiazeneiumdioxy)-tributyltin or K salts, bis-N-(cyclohexyldiazeniumdioxy)-copper, N-methylisothiazolin-3-one, 5-chloro-N-methylisothiazolin-3-one, 4,5-dichloro-N-octylisothiazolin-3-one, N-octyl-isothiazolin-3-one,4, 5-trimethylene-isothiazolinone,4,5-benzoisothiazolinone, N-methylolchloroacetamide.

Aldehydes, such as cinnamaldehyde, formaldehyde, glutaraldehyde, β-bromocinnamaldehyde; thiocyanates, such as thiocyanatomethylthiobenzothiazole, methylenebisthiocyanate, and the like;

Quaternary ammonium compounds, such as benzyldimethyltetradecylammonium chloride, benzyldimethyldodecylammonium chloride, didecyldimethaylammonium chloride;

Iodine derivatives, such as diiodomethyl p-tolyl sulphone, 3-iodo-2-propinyl alcohol, 4-chloro-phenyl-3-iodopropargyl formal, 3-bromo-2,3-diiodo-2-propenyl ethylcarbamate, 2,3,3-triiodoallyl alcohol, 3-bromo-2,3-diiodo-2-propenyl alcohol, 3-iodo-2-propinyl n-butylcarbamate, 3-iodo-2-propinyl n-hexylcarbamate, 3-iodo-2-propinyl cyclohexyl-carbamate, 3-iodo-2-propinyl phenylcarbamate;

Phenol derivatives, such as tribromophenol, tetrachlorophenol, 3-methyl-4-chlorophenol, 3,5-dimethyl-4-chlorophenol, phenoxyethanol, dichlorophene, o-phenylphenol, m-phenylphenol, p-phenylphenol, 2-benzyl-4-chlorophenol and their alkali metal and alkaline earth metal salts.

Microbicides having an activated halogen group, such as chloroacetamide, bronopol, bronidox, tectamer, such as 2-bromo-2-nitro-1,3-propanediol, 2-bromo-4'-hydroxy-acetophenone, 2,2-dibromo-3-nitrile-propionamide, 1,2-dibromo-2,4-dicyanobutane, β-bromo-β-nitrostyrene;

Pyridines, such as 1-hydroxy-2-pyridinethione (and their Na, Fe, Mn, Zn salts), tetrachloro-4-methylsulphonylpyridine, pyrimethanol, mepanipyrim, dipyrithion;

Metal soaps, such as tin naphtenate, copper naphtenate, zinc naphtenate, tin octoate, copper octoate, zinc octoate, tin 2-ethylhexanoate, copper 2-ethylhexanoate, zinc 2-ethylhexanoate, tin oleate, copper oleate, zinc oleate, tin phosphate, copper phosphate, zinc phosphate, tin benzoate, copper benzoate and zinc benzoate;

Metal salts, such as sodium dichromate, potassium dichromate, potassium chromate, copper borate, zinc fluorosilicate, copper fluorosilicate. Oxides, such as tributyltin oxide, $Cu_2O$, CuO, ZnO;

Dialkyldithiocarbamates, such as Na and Zn salts of dialkyldithiocarbamates, tetramethylthiuram disulphide, potassium N-methyl-dithiocarbamate;

Nitriles, such as 2,4,5,6-tetrachloroisophthalonitrile, disodium cyanodithioimidocarbamate;

Quinolines, such as 8-hydroxyquinoline, and their Cu salts;

Mucochloric acid, 5-hydroxy-2(5H)-furanone;

4, 5-D ichlorodithiazolinone, 4,5-benzodithiazolinone, 4,5-trimethylenedithiazolinone, 4,5-dichloro-(3H)-1,2-dithiol-3-one, 3,5-dimethyl-tetrahydro-1,3,5-thiadiazine-2-thione, N-(2-p-chlorobenzoylethyl)-hexaminium chloride, potassium N-hydroxymethyl-N'-methyl-dithiocarbamate, 2-oxo-2-(4-hydroxy-phenyl)acethydroximic acid chloride, phenyl 2-chloro-cyano-vinyl sulphone, phenyl 1,2-dichloro-2-cyano-vinyl sulphone;

Ag, Zn or Cu-containing zeolites, alone or enclosed in polymeric active compounds;

Phosphoric esters, such as azinphos-ethyl, azinphos-methyl, α-1(4-chlorophenyl)-4-(O-ethyl, S-propyl) phosphoryloxy-pyrazole, chlorpyrifos, coumaphos, demeton, demeton-S-methyl, diazinone, dichlorovos, dimethoate, ethoate, ethoprophos, etrimfos, fenitrothion, fenthion, heptenophas, parathion, parathion-methyl, phosalone, poxim, pirimiphos-ethyl, pirimiphos-methyl, profenofos, prothiofos, sulfprofos, triazophos and trichlorphon;

Carbamates, such as aldicarb, bendiocarb, α-2-(1-methylpropyl)-phenyl methyl carbamate, butocarboxim, butoxycarboxim, carbaryl, carbofuran, carbosulfan, cloethocarb, isoprocarb, methomyl, oxamyl, pirimicarb, promecarb, propoxur and thiodicarb;

Organosilicon compounds, preferably dimethyl(phenyl) silyl-methyl-3-phenoxybenzyl ethers, such as dimethyl-(4-ethoxyphenyl)-silylmethyl-3-phenoxybenzyl ether or (dimethylphenyl)-silyl-methyl-2-phenoxy-6-pyridylmethyl ethers such as, for example dimethyl-(9-ethoxy-phenyl)-silylmethyl-2-phenoxy-6-pyridylmethyl ether or [(phenyl)-3-(3-phenoxyphenyl)-propyl[(dimethyl)-silanes such as, for example, (4-ethoxyphenyl)-[3-(4-fluoro-3-phenoxyphenyl-propyl]dimethyl-silane, silafluofen;

Pyrethroids, such as allethrin, alphamethrin, bioresmethrin, byfenthrin, cycloprothrin, cyfluthrin, decamethrin, cyhalothrin, cypermethrin, deltamethrin, alpha-cyano-3-phenyl-2-methylbenzyl 2,2-dimethyl-3-(2-chloro-2-trifluoro-methylvinyl)cyclopropane-carboxylate, fenpropathrin, fenfluthrin, fenvalerate, flucythrinate, flumethrin, fluvalinate, permethrin, resmethrin and tralomethrin;

Nitroimines and nitromethylenes, such as 1-[(6-chloro-3-pyridinyl)-methyl]-4,5-dihydro-N-nitro-1H-imidazol-2-amine (imidacloprid), N-[(6-chloro-3-pyridyl)methyl-]$N^2$-cyano-$N^1$-methylacetamide (NI-25);

Abamectin, AC 303, 630, acephate, acrinathrin, alanycarb, aldoxycarb, aldrin, amitraz, azamethiphos, Bacillus thuringiensis, phosmet, phosphamidon, phosphine, prallethrin, propaphos, propetamphos, prothoate, pyraclofos, pyrethrins, pyridaben, pyridafenthion, pyriproxyfen, quinalphos, RH-7988, rotenone, sodium fluoride, sodium hexafluorosilicate, sulfotep, sulfuryl fluoride, tar oils, teflubenzuron, tefluthrin, temephos, terbufos, tetrachlorvinphos, tetramethrin, O-2-tert-butyl-pyrimidin-5-yl-o-isopropyl-phosphorothiate, thiocyclam, thiofanox, thiometon, tralomethrin, triflumuron, trimethacarb, vamidothion, Verticillium Lacanii, XMC, xylylcarb, benfuracarb, bensultap, bifenthrin, bioallethrin, MERbioallethrin (S)-cyclopentenyl isomer, bromophos, bromophos-ethyl, buprofezin, cadusafos, calcium polysulphide, carbophenothion, cartap, quinomethionate, chlordane, chlorfenvinphos, chlorfluazuron, chlormephos, chloropicrin, chlorpyrifos, cyanophos, beta-cyfluthrin, alpha-cypermethrin, cyophenothrin, cryomazine, dazomet, DDT, demeton-S-methylsulphone, diafenthiuron, dialifos, dicrotophos, diflubenzuron, dinoseb, deoxabenzofos, diazacarb, disulfoton, DNOC, empenthrin, endosulfan, EPN, esfenvalerate, ethiofencarb, ethion, etofenprox, fenobucarb, fenoxycarb, fensulfothion, fipronil, flucycloxuron, flufenprox, flufenoxuron, fonofos, formetanate, formothion, fosmethilan, furathiocarb, heptachlor, hexaflumuron, hydramethylnon, hydrogen cyanide, hydroprene, IPSP, isazofos, isofenphos, isoprothiolane, isoxathion, iodofenphos, kadethrin, lindane, malathion, mecarbam, mephosfolan, mercurous, chloride, metam, Metarthizium, anisopliae, methacrifos, methamidophos, methidathion, methiocarb, methoprene, methxychlor, methyl isothiocyanate, metholcarb, mevinphos, monocrotophos, naled, Neodiprion sertifer NPV, nicotine, omethoate, oxydemeton-methyl, pentachlorophenol, petroleum oils, phenothrin, phenthoate, phorate;

Especially preferred mixtures comprise, as insecticides, chloropyrifos, phoxim, silafluofen, cyfluthrin, cypermethrin, deltamethrin, permethrin, imidacloprid, hexaflunuron, lindane.

Especially preferred is the use of tebuconazole as the sole fungicide or synergistic mixtures of tebuconazole and cyproconazole and optionally bromoconazole and/or hexaconazole and/or propiconazole and/or tridemorph tebuconazole and metconazole and optionally cyproconazole and/or hexaconazole and/or tridemorph tebuconazole and hexaconazole and optionally cyproconazole and/or metconazole and/or bromoconazole and/or tridemorph tebuconazole and 1-(2-chlorophenyl)-2-(1-chloro-cycloprop-1-yl)-3-(1,2,4-triazol-1-yl)-propan-2-ol and optionally cyproconazole and/or metconazole and/or bromoconazole and/or hexaconazole and/or tridemorph tebuconazole and tridemorph and optionally cyproconazole and/or propiconazole and/or bromoconazole and/or hexaconazole and/or penconazole, tebuconazole and propiconazole and optionally cyproconazole and/or bromoconazole and/or hexaconazole and/or metconazole and/or tridemorph and/or penconazole and/or 1-(2-chlorophenyl)-2-(1-chlorocycloprop-1-yl)-3-(1,2,4-triazol-1-yl)-propan-2-ol cyproconazole and bromoconazole and/or metconazole and/or hexaconazole and/or tridemorph, hexaconazole and bromoconazole and/or metconazole and/or penconazole and/or tridemorph, -penconazole and cyproconazole and/or metconazole and/or bromoconazole and/or tridemorph.

The synergistic effect of the mixtures is observed in mixing ratios of 99:1 to 1:99, preferably from 3:1 to 1:3, very especially preferably in a ratio of 1:1.

The ratio of copper ions to the total of the fungicide mixture should amount to at least 1:2.5 to 1,000:1; mixtures of 5:1 to 500:1 are preferred, mixtures of 10:1 to 100:1 especially preferred.

Additive boron salts or boric acid and nitrite (for example in the form of sodium nitrite) are preferably to be added in the ratio of 1:50 to 50:1, based on the copper ions. The exact amount is to be adjusted to the specific fungicide mixture and depends on the solubility of the resulting finished mixture in water, as does the amount of emulsifier to be added (if appropriate).

An emulsifier is, for example, an anionic, cationic or non-ionic emulsifier or a mixture of these. Non-ionic emulsifiers are, for example, adducts of ethylene oxide (EO) or propylene oxide or mixtures of these to organic hydroxy compounds, for example alkylphenols, fatty acid, fatty alcohols and mixtures of these. Cationic emulsifiers which may be used are, for example, quaternary ammonium compounds and/or salts of fatty amines (for example dimethyl-($C_{12}$–$C_{14}$)alkylamine).

The polymeric quaternary ammonium borates or substances which are obtained by simultaneously reacting amides of the general formulae I or II

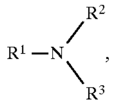

(I)

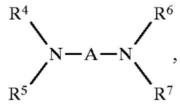

(II)

with 2 to 20, preferably 3 to 10, mols of ethylene oxide or propylene oxide and 0.6 to 1.5, preferably 1 mol, of boric acid, boric esters or salts of boric acid, in each case per mol of nitrogen equivalent, where $R^1$ denotes $C_8$–$C_{22}$-alkyl or $C_8$–$C_{22}$-alkenyl, or, if $R^2$ and $R^3$ are groups of the formula —$(C_2H_4O)_xH$ or —$(C_3H_6O)_xH$, $R^1$ may also denote $C_1$–$C_4$-alkyl, $R^2$ denotes hydrogen, $C_1$–$C_{22}$-alkyl or a group of the formulae —$C_2H_4O)_xH$, —$(C_3H_6O)_xH$ or $CH_2CH_2CH_2NH_2$, and $R^4$ and $R^6$ denote $C_1$–$C_4$-alkyl or a group of the formulae —$C_2H_4O)_xH$ or —$C_3H_6H)_xH$, $R^5$ and $R^7$ denote a group of the formula —$(C_2H_4O)_xH$ or —$(C_3H_6O)_xH$, A a group of the formulae —$(CH_2)_n$—, —$(CH_2CH_2OCH_2OH)_n$—, or —$(CH_2CH_2NHCH_2CH_2)$n-x, denotes numbers from 1 to 55 and n an integer from 1 to 20.

The following are preferred as amines of the above formulae:

1. Amides of the formula I where $R^1$ denotes $C_8$–$C_{22}$-alkyl, $R^2$ denotes $C_8$–$C_{22}$-alkyl or $C_1$–$C_4$-alkyl and $R^3$ denotes hydrogen or a group of the formulae —$(C_2H_4O)_xH$ or —$(C_3H_6O)_xH$.

2. Amines of the formula I where $R^1$ denotes $C_8$–$C_{22}$-allyl and $R^2$ and $R^3$ denote hydrogen.
3. Amines of the formula I where $R^1$ denotes $C_1$–$C_4$-alkyl or $C_8$–$C_{22}$-alkyl and $R^2$ and $R^3$ denote groups of the formulae $—(C_2H_4O)_xH$ or $—(C_3H_6O)_xH$, with the total of the ethylene oxide groups in both radicals $R^2$and $R^3$being 2 to 20.
4. Amines of the formula I where $R^1$ denotes $C_8$–$C_{22}$-alkyl, $R^2$ denotes hydrogen or a group of the formula $—CH_2CH_2CH_2NH_2$ and $R^3$ denotes a group of the formula $—CH_2CH_2CH_2NH_2$.
5. Amines of the formula II where A, $R^4$, $R^5$, $R^6$ and $R^7$ have the abovementioned meanings, the total of all ethylene oxide groups being 4 to 30.

Amongst the alkylene oxide groups of the formulae $-C_2H_4O)_xH$ and $—(C_3H_6O)_xH$, the group of the formula $—(C_2H_4O)_xH$ is preferred. Such radicals, which are composed of both ethylene oxide and propylene oxide units, may also be present instead of the pure polyoxyethylene and polyoxypropylene groups.

The reaction of the amines with the boric acid and the alkylene oxide is carried out in such a manner that the amine in question and the boric acid is introduced into an autoclave and the alkylene oxide is metered in. In general, the reaction temperature is 60° to 130° C., preferably 60° to 125° C., in particular 60° to 100° C. The reaction pressure is 50 to 600 kPa. Under these reaction conditions, the alkylene oxide is metered in over a period of 1 to 5 hours. For after-reaction, the mixture is held for 3 to 12 hours at a temperature of 70° to 120° C., preferably 70° to 100° C., at the pressure indicated.

Instead of the boric acid, it is also possible to employ its esters, such as, for example, trimethylboric acid esters or salts thereof, for example sodium borate. Water and polyglycols are formed during the reaction as secondary products.

The resulting polymeric quaternary ammonium compounds comprise, as structural characteristic, essentially groups of the formula

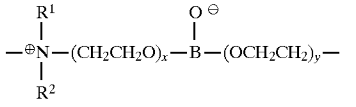

or groups of the formula

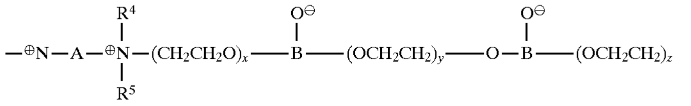

when the reaction has been carried out with ethylene oxide. They are to be considered polymeric betaines.

Compounds of the abovementioned type and their preparation are described in EP-556 454 and EP-355 316.

A quaternary ammonium compound is, for example, a compound which corresponds to the general formula $R^1R^2R^3R^4N+Z—$ where $R^1$ denotes an alkyl radical having 8 to 20 carbon atoms, in particular an alkyl radical having 12 to 20 carbons or a benzyl radical, optionally substituted by $C_1$- to $C_{20}$-alkyl or halogen, $R^2$ denotes $C_1$- to $C_6$-alkyl, $C_3$- to $C_9$-alkoxyalkyl, polymeric ethylene oxide (EO) or propylene oxide (PO) where EO or PO n=2 to 50, $R^3$ denotes $C_1$- to $C_6$-alkyl, $C_3$- to $C_4$-alkoxyalkyl, polymeric ethylene oxide (EO) or propylene oxide (PO) where EO or PO n=2 to 50, $R^4$ denotes $C_1$- to $C_{20}$-alkyl or in each case two of the radicals $R^1$ to $R^4$ together with the nitrogen atom form a heterocyclic radical which comprises 4 to 5 C atoms and one, two or three double bonds, the carbon atoms optionally being substituted by $C_1$- to $C_4$-alkyl or halogen and Z. denoting an acid radical, for example halide.

Aliphatic carboxylic acids may be added to improve the homogeneity of the concentrates. Examples of such acids are propionic acid, hexanoic acid, heptanoic acid, branched carboxylic acids such as, for example, 2-ethylhexanoic acid, isooctanoic acid, neocarboxylic acids, aliphatic dicarboxylic acids such as, for example, sebacic acid, cycloalkylcarboxylic acids such as, for example, cyclohexanoic acid, arylcarboxylic acids such as, for example, benzoic acid, 3- or 4-hydroxybenzoic acid or alkoxybenzoic acid, tartaric acid or glycine or the salts of the acids such as sodium, potassium salts.

When using the abovementioned acids, it is sometimes advantageous to improve the wood preservative penetration in industrial-scale processes by adding complexing, polymeric nitrogen compounds such as, for example, polyethyleneimines.

Polyethyleneimines (PEI, polymin) are known and are formed by polymerizing 1,2-ethyleneimine. In these substances, the nitrogen exists in primary form (terminal group), secondary and tertiary form (branching). Suitable polyethyleneimines are those where n is greater than 10; very good results are achieved by using PEI with a degree of polymerization n of between 50 and 1,000. Polylysines (Sigma) may also be used.

If appropriate, the wood preservatives may comprise other compounds, for example compounds with a fungicidal anion such as, for example, a boron compound (for example alkali metal borate, amine borate, boric acid, boric esters), fluorides (for example potassium fluoride and/or salts of fluoroboric acid and/or fluorophosphoric acid and/or difluorophosphoric acid).

The spectrum of action of the wood preservatives according to the invention can be improved, if appropriate, by adding further active compounds. Examples of suitable compounds are N-organodiazeniumdioxy compounds, organotin compounds, especially tributyl(TBT)tin compounds, isothiazoline compounds of the following formula

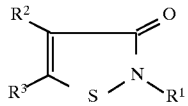

$R^1$ is hydrogen, an alkyl, alkenyl, alkinyl radical having 1 to 18 carbon atoms, cycloalkyl radical having a $C_3$- to $C_6$-ring and up to 12 carbon atoms, and aralkyl or aryl radical having up to 19 carbon atoms, $R^2$, $R^3$ independently of one another hydrogen, halogen or $C_1$- to $C_4$-alkyl radical, or $R^2$ and $R^3$ part of an aromatic radical or $R^2$–$R^6$ form $—CH_2—CH_2—CH_2—$.

An addition of other fungicides and insecticides is also possible, for example in emulsified form, such as N-tridecyl-2,6-dimethylmorpholine (tridemorph) and/or 4-(3-para-tertiary-butylphenyl)2-methyl-propyl-2,6-cis-dimethylmorpholine (fenpropimorph) and/or aldimorph, chlorinated phenols tetrachloroisophthalonitrile, N-cyclohexyl-N-methoxy-2,5-dimethyl-furan-3-carboxamide, N-dimethyl-N'-phenyl-(N-fluoromethylthio)-sulfamide, N,N-dimethyl-N'-toluyl-(N-fluoromethylthio)-sulfamide, benzimidazole-2-carbamate-methyl ester, 2-thiocyanomethyl-thiobenzothiazole, 2-iodobenzanilide, 1-(1', 2', 4'-triazolyl-1')-(1-(4'-chlorophenoxy)-3,3-dimethylbutan-2-one, 1-(1', 2', 4'-triazolyl-1')-(1-(4'-chlorphenoxy)-3,3-dimethylbutan-2-ol, hexachlorocyclohexane, O,O-diethyl-dithio-phosphoryl-methyl-6-chlorobenzoxazolone, 2-(1,3-thiazol-4-yl)benzimidazole, N-trichloromethylthio-3,6,7, 8-tetrahydrophthalimide, N-(1,1,2,2-tetrachloroethylthio)-3,6,7,8-tetrahydrophthalimide, N-trichloromethylthiophthalimide, 3-iodo-2-propyl butylcarbamate, O,O-dimethyl S-(2-methylamino-2-oxoethyl)-dithiophosphate, O,O-dimethyl O -(3,5,6-trichloro-2-pyridyl)-thiophosphate, O,O-dimethyl S-(N-phthalimido)-methyldithiophosphate, O,O-diethyl-O-(α(-cyanobenzylidene-amino)-thiophosphate, 6,7,8,9,10-hexachloro, 1,5,5a,6,9,9a-hexahydro-6,9-methanol-2,3,4-benzodioxothiepien 3-oxide, (4-ethoxyphenyl)-(dimethyl)-(3-(4-fluoro-3-phenoxy-phenyl)-propyl-silane, 2-sec-butyl-p0henyl N-methylcarbamate, 2-1-propoxyphenyl N-methyl-carbamate, N-methyl-1-naphthyl-carbamate, Norbonene-dimethanohexa-chlorocyclosulphite, 1-(4-chlorophenyl)-3-(2,6-di-fluorobenzoyl)-urea.

Acypetacs, 2-aminobutane, ampropylfos, anilazine, benalaxyl, bupirimate, quinomethionate, chloroneb, chlozolinate, cymoxanil, dazomet, diclomezine, dichloram, diethofencarb, dimethirimol, diocab, dithianon, dodine, drazoxolon, edifenphos, ethirimol, etridiazole, fenarimol, fenitropan, fentin acetate, fentin hydroxide, ferimzone, fluazinam, fluromide, flusulfamide, flutriafol, fosetyl, fthalide, furalaxyl, guazatine, hymexazol, iprobenfos, iprodione, isoprothiolane, metalaxyl, methasulfocarb, nitrothal-isopropyl, nuarimol, ofurace, oxadiyl, perflurazoate, pencycuron, phosdiphen, pimaricin, piperalin, procymidone, propamocarb, propineb, pyrazophos, pyrifenox, pyroquilon, quintozene, tar oils, tecnazene, thicyofen, thiophanate-methyl, tolclofos-methyl, triazoxide, trichlamide, tricyclazole, triforine, vinclozolin.

Surprisingly, these active compound combinations display a particularly high mitcrobicidal, in particular fungicidal, activity combined with a broad spectrum of action against microorganisms and insects which are relevant in the protection of wood; they act mainly against moulds, wood-discoloring and wood-destroying fungi and insects. The following groups of microorganisms may be mentioned by way of example, but not by way of limitation:

A: Discoloring Fungi

A1: Ascomycetes

Ceratocystis, such as *Ceratocystis minor*

A2: Deuteromycetes

Aspergillus, such as *Aspergillus niger*

Aureobasidium, such as *Aureobasidium pullulans*

Dactylium, such as *Dactylium fusarioides*

Penicillium, such as *Penicillium brevicaule* or *Penicillium variabile*

Sclerophoma, such as *Schlerophoma pithyophila*

Acopularia, such as *Scopularia phycomyces*

Trichoderma, such as *Trichoderma viride* or *Trichoderma lignorum*

A3: Zygomycetes

Mucor, such as *Mucor spinorus*

B: Wood-destroying Fungi

B1: Ascomycetes

Chaetomium, such as *Chaetomium globosum* or *Chaetomium alba-arenulum*

Humicola, such as *Humicola grisea*

Petriella, such as *Petriella setifera*

Trichurus, such as *Trichurus spiralis*

B2: Basidiomycetes

Coniophora, such as *Coniophora puteana*

Coriolus, such as *Coriolus versicolor*

Donkioporia, such as *Donkioporia expansa*

Glenospora, such as *Glenospora graphii*

Gloeophyllum, such as *Gloeophyllum abietinum* or *Gloeophyllum adoratum* or *Gloeophyllum protactum* or *Gloeophyllum sepiarium* or *Gloeophyllum trabeum*

Lentinus, such as *Lentinus cyathiformes* or *Lentinus edodes,* such as *Lentinus lepideus* or *Lentinus grinus* or *Lentinus squarrolosus*

Paxillus, such as *Paxillus panuoides*

Pleurotus, such as *Pleurotus ostreatus*

Poria, such as *Poria monticola* or *Poria placenta* or *Poria vaillantii* or *Poria vaporaria*

Serpula, such as *Serpula himantoides* or *Serpula lacrymans*

Stereum, such as *Stereum hirsutum*

Tyromyces, such as *Tyromyces palustris*

B3: Deuteromycetes

Alternaria, such as *Alternaria tenius*

Cladosporium, such as *Cladosporium herbarum*

*Alternaria tenuis*

C. Wood-destroying Insects Such As

C1: Beetles

*Hylotrupes bajulus, Chlorophorus pilosis, Anobium punctatum, Xestobium rufovillosum, Ptilinus pecticornis, Dendrobium pertinex, Ernobius mollis, Priobium carpini, Lyctus brunneus, Lyctus africanus,* Lyctus Planicollis, *Lyctus linearis, Lyctus pubescens, Trogoxylon aequale, Minthes rugicollis, Xyleborus spec., Tryptodendron spec. Apate monachus, Bostrychus capucins, Heterobostrychus brunneus, Sinoxylon spec. Dinoderus minutus*

C2: Hymenoptera

*Sirex juvencus, Urocerus gigas, Urocerus gigas taignus, Urocerus augur*

C3: Termites

*Kalotermes flavicollis, Cryptotermers brevis, Heterotermes indicola, Reticulitermes flavipes, Reticulitermes santonensis, Reticulitermes lucilugus, Mastotermes darwiniensis, Zootermopsis nevadensis, Coptotermes formosanus.*

The amount of compositions or concentrates employed depends on the species and on the incidence of the insects, microorganisms, the microbiological count and the medium. The optimum amount used can be determined for each use by test series. However, in general, it suffices to employ 0.001 to 20% by weight, preferably 0.05 to 10% by weight, of the active compound mixture, based on the material to be protected.

In general, the insecticides are present in a use concentration of from 0.00001% to 10%, preferably 0.00001% to 5%, especially preferably 0.001% to 1%.

The formulations mentioned can be prepared in a manner known per se, for example by mixing the active compounds with the solvent or diluent, emulsifier, dispersant and/or binder or fixative, water repellant, if appropriate desiccants and UV stabilizers and, if appropriate, dyes and pigments and other processing auxiliaries.

In addition to water, optional solvents and/or diluents are an organochemical solvent or solvent mixture and/or an oily or oil-type organochemical solvent or solvent mixture of low volatility and/or a polar organochemical solvent or solvent mixture.

Organochemical solvents which are preferably employed are oily or oil-type solvents with an evaporation number of above 35 and a flash point of above 30° C., preferably above 45° C. Such water-insoluble, oily and oil-type solvents of low volatility which are used are suitable mineral oils or their aromatic fractions or mineral-oil-containing solvent mixtures, preferably white spirit, petroleum and/or alkyl benzene.

Mineral oils which are preferably used are those with a boiling range of from 170° to 220° C., white spirit with a boiling range of 170° to 220° C., spindle oil with a boiling range of from 250° to 350° C., petroleum and aromatics with a boiling range of from 160° to 280° C., oil of turpentine and the like.

In a preferred embodiment, liquid aliphatic hydrocarbons with a boiling range of from 180° to 210° C. or high-boiling mixtures of aromatic and aliphatic hydrocarbons with a boiling range of 180° to 220° C. and/or spindle oil and/or monochloronaphthalene are used, preferably α-monochloronaphthalene.

The organic oily or oil-type solvents of low volatility and with an evaporation number of above 35 and a flash point of above 30° C., preferably above 45° C., can be replaced in part by organochemical solvents of high or medium volatility, with the proviso that the solvent mixture also has an evaporation number of above 35 and a flashpoint of above 30° C., preferably 45° C., and that the insecticide/fungicide mixture is soluble or emulsifiable in this solvent mixture.

In a preferred embodiment, aliphatic organochemical solvents which contain hydroxyl and/or ester and/or ether groups are used, such as, for example, glycol ethers, esters or the like.

Organochemical binders used for the purposes of the present invention are the and/or synthetic resins binding drying oils which are known per se and which can be diluted in water and/or dissolved or dispersed or emulsified in the organochemical solvents employed, in particular binders composed of, or comprising, an acrylate resin, a vinyl resin, for example polyvinyl acetate, polyester resin, polycondensation or polyaddition resin, polyurethane resin, alkyd resin or modified alkyd resin, preferably of medium oil length, phenol resin, hydrocarbon resin such as indene/coumarone resin, silicone resin, drying vegetable and/or drying oils and/or physically drying binders based on a natural and/or synthetic resin.

The synthetic resin used as binder can be employed in the form of an emulsion, dispersion or solution. Bitumen or bituminous substances may also be used as binders, in amounts of up to 10% by weight. In addition, colorants, pigments, water repellants, flavour-masking agents and inhibitors or anticorrosive agents and the like, all of which are known per se, can additionally be employed.

The composition or the concentrate preferably comprises, in accordance with the invention, at least one alkyd resin or modified alkyd resin and/or a drying vegetable oil as organochemical binder. Substances which are preferably used in accordance with the invention are alkyd resins with an oil content of over 45% by weight, preferably 50 to 68% by weight.

The abovementioned binder can be replaced fully or in parts by a fixative (mixture) or a plasticizer (mixture). These additives are intended to prevent volatilization of the active compounds, and also crystallization or precipitation. They preferably replace 0.01 to 30% of the binder (based on 100% of binder employed).

The plasticizers are from the chemical classes of the phthalic esters, such as dibutyl phthalate, dioctyl phthalate or benzyl butyl phthalate, phosphoric esters such as tributyl phosphate, adipic esters such as di-(2-ethylhexyl) adipate, stearates such as butyl stearate or amyl stearate, oleates such as butyl oleate, glycerol ethers or higher-molecular-weight glycol ethers, glycerol esters and p-toluenesulphonic esters.

Fixatives are based chemically on polyvinyl alkyl ethers such as, for example, polyvinyl methyl ether or ketones such as benzophenone, ethylenebenzophenone.

Other auxiliaries used as component for wood preservatives are, preferably, also the auxiliaries described in EP-383 746, pages 5–6.

Wood which can be protected by the composition according to the invention, or by mixtures comprising the former, is to be understood as meaning, for example, construction timber, wooden beams, railway sleepers, bridge components, jetties, wooden vehicles, boxes, pallets, containers, telephone poles, wooden claddings, windows and doors made from wood, plywood, chipboard, joiners' work or woodbased materials which quite generally are used in domestic construction or in joinery. Particularly effective protection of wood is achieved by industrial-scale impregnating processes, for example vacuum, double-vacuum or pressure processes.

The water-dilutable wood preservatives comprise—in concentrated form the triazole/fungicide or insecticide mixture in general in amounts of from 0.01 to 95% by weight, in particular 0.01 to 60% by weight.

The water-dilutable wood preservatives comprise—in concentrated form—the copper, calculated as metal, in general, for example, in an amount of from 1.0 to 15.0% (per cent by weight).

Suitable concentrates are composed of, for example, 0.50 to 45% of copper compounds 5.00 to 50% of polyaspartic acid or its derivatives 0.25 to 15% of synergistic triazole/fungicide or insecticide mixture 0.5 to 30% of an emulsifier and/or a phosphonium compound and/or tridemorph or aldimorph 0 to 40% of a compound with a fungicidal inorganic or organic anion 0 to 40% of organic solvents 0 to 40% of an aliphatic mono- or dicarboxylic acid and/or cycloalkylcarboxylic and/or cycloarylcarboxylic acid and/or boric acid or of a borate 0 to 15% of complexing polymeric nitrogen compound 0 to 5% alkanolamine, the total in each case amounting to 100% by weight, and, if appropriate, minor amounts of other components such as, for example, ammonia, corrosion inhibitors, complexing acids (for example nitrilotriacetic acid, ethylenediaminetetraacetic acid when using water with higher degrees of hardness) and, if necessary, water, but the latter is used essentially for handling and its amounts may generally be kept low.

However, the invention not only extends to the wood preservatives (concentrates), but, equally, also to the impregnating solutions of correspondingly lower individual concentration which can be prepared by diluting the concentrates with water. For example, the use concentration is 0.01 to 1.50% by weight of metal, for example copper, in the aqueous impregnating solution, depending on the type of impregnation and the degree of risk of the wood to be impregnated.

The dissolving of the copper salts, if appropriate with the addition of heat, in polyaspartic acid/derviatives thereof, if appropriate with the addition of acid, water, alkanolamine or solvent, and subsequent addition of the emulsifier, the triazole compounds and the synergistic component, results in highly concentrated pastes, liquid concentrates or else two-phase mixtures which after dilution with water can be used for impregnating wood. They result in a clear fluid, even when their concentration in water is high.

The impregnating solution for the protection of wood can be applied by manual processes, such as spraying, brushing on, immersion or vat soaking, or by industrial-scale processes, such as boiler pressure, alternating-pressure and double-vacuum processes. "Wood" is to be understood as meaning both solid wood and woodbased materials such as chipboard, plywood; in this case, the wood preservative may also be incorporated by the glue incorporation method.

The degree of copper fixation of the wood preservatives according to the invention is high, when used for industrial-scale processes, it is over 90%.

The concentrates or solutions can be coloured by pigment preparations and/or colorants which are soluble or emulsifiable in water.

To achieve a water-repellant effect or to improve the degree of fixation, it is possible to add wax dispersions, paraffin dispersions and/or acrylate dispersions.

If appropriate, the concentrates may also be incorporated into binder-comprising water-dilutable systems (undercoats, glazes).

The compositions according to the invention allow in an advantageous manner the compositions available to date to be replaced by more efficient ones. They have good stability and, in an advantageous manner, display a broad spectrum of action.

We claim:

1. A composition for preserving wood, said composition comprising the following ingredients:

a) at least one copper compound;

b) a polyaspartic acid compound;

c) a triazole compound; and d) an emulsifier;

wherein said polyaspartic acid compound comprises repeating succinyl units selected from the group consisting of succinyl units of the following formulae:

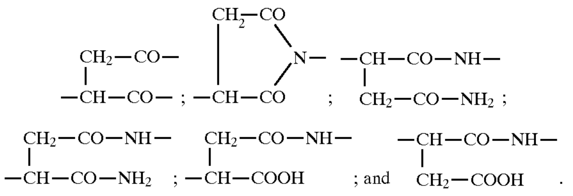

2. A composition according to claim 1, which further comprises, in addition to ingredients a)–d), another fungicide or herbicide.

3. A composition according to claim 1, which further comprises an alkanolamine.

4. A composition according to claim 2, which further comprises an alkanolamine.

5. A method of preserving wood, said method comprising applying to said wood an amount of a composition according to claim 1 which is effective to preserve said wood.

6. A method of preserving wood, said method comprising applying to said wood an amount of a composition according to claim 2 which is effective to preserve said wood.

7. A method of preserving wood, said method comprising applying to said wood an amount of a composition according to claim 3 which is effective to preserve said wood.

8. A method of preserving wood, said method comprising applying to said wood an amount of a composition according to claim 4 which is effective to preserve said wood.

* * * * *